R. R. LLOYD.
PUNCTURE PROOF INNER TUBE.
APPLICATION FILED AUG. 19, 1920.
1,392,894.
Patented Oct. 4, 1921.
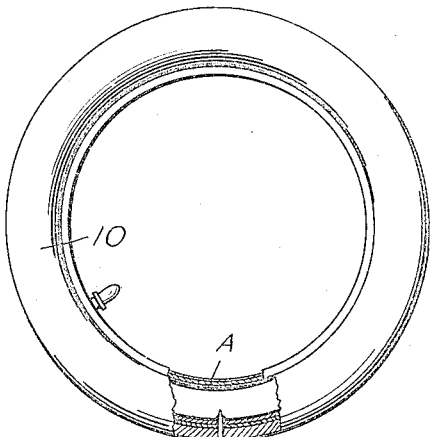
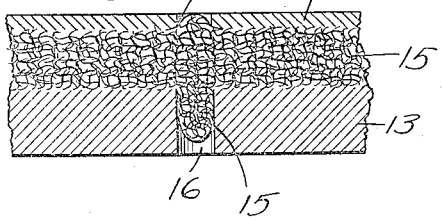
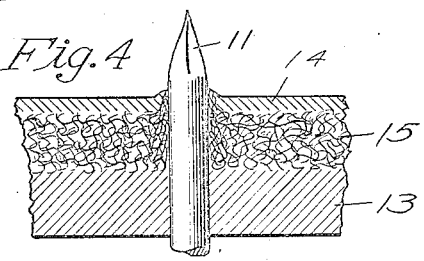
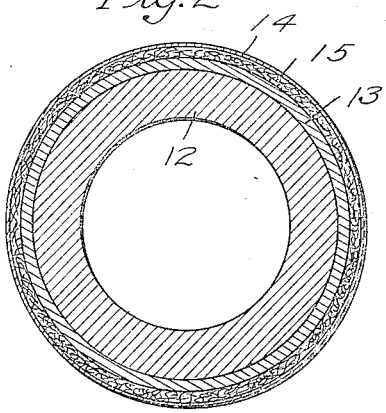
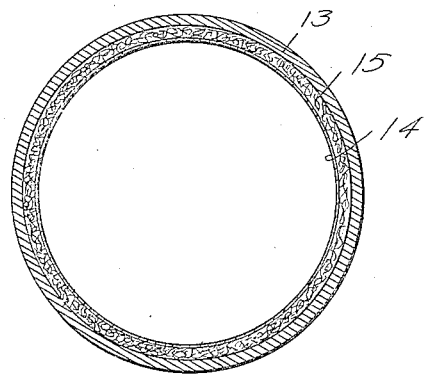
Witness
Lynn Latta
Inventor
Robert R. Lloyd
By Bair & Freeman Attorneys

UNITED STATES PATENT OFFICE.

ROBERT R. LLOYD, OF DES MOINES, IOWA, ASSIGNOR OF ONE-HALF TO JOHN GRIFFIN, OF DES MOINES, IOWA.

PUNCTURE-PROOF INNER TUBE.

1,392,894.  Specification of Letters Patent.  Patented Oct. 4, 1921.

Application filed August 19, 1920. Serial No. 404,556.

*To all whom it may concern:*

Be it known that I, ROBERT R. LLOYD, a citizen of the United States, and a resident of Des Moines, in the county of Polk and State of Iowa, have invented a certain new and useful Puncture-Proof Inner Tube, of which the following is a specification.

The object of my invention is to provide a puncture proof inner tube of simple, durable and inexpensive construction, that may be built upon the same machinery and with the same equipment, as is the ordinary inner tube.

In order to thoroughly understand my structure, it is necessary to remember that the rubber used for making inner tubes is cured and prepared by using various chemical mixtures with the pure rubber and then heating under pressure until the chemicals and the rubber have become thoroughly mixed and formed together, so that firmness and hardness may be given to the rubber, while retaining a high degree of elasticity.

It will be also understood that varying the amount of chemicals mixed with the rubber, commonly known as pará, makes it possible to vary the length of time necessary to properly cure the tube, after it has been formed.

A further object of my inner tube is to so adapt it that a certain degree of firmness and hardness will be had on the outer and inner surfaces of the tube, but that the layer of material between the outer and inner surfaces will be of such elasticity, that when a sharp object is forced through and then withdrawn, the elasticity of the middle layer of material will be such that it will move into the opening thus formed and seal the opening against the escape of any of the air within the tube.

A further object is to so mix the rubber with chemicals, so that when the tube is placed into the curing apparatus, the layer of material that will be normally on the inside of the tube will be only semi-cured, while the middle layer will not be cured at all and the outside layer will be given substantially a full cure.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Figure 1 shows a side elevation of my tube installed in a casing, parts being broken away to better illustrate the construction.

Fig. 2 shows a central, sectional view taken through the tube when it is being formed on the mandrel.

Fig. 3 shows a central, sectional view taken through the tube when it is in the form ready for use.

Fig. 4 shows a large, detail view of a portion of the tube with a pin therein; and Fig. 5 shows a detail, sectional view through a portion of the tube, which has been punctured, showing how the opening caused by the puncture will be sealed.

In the accompanying drawings, I have used the reference numeral 10 to indicate an ordinary tire casing, which receives the inner tube A.

A nail or other sharp piercing member 11 is shown as puncturing the inner tube A. My improved inner tube A is built up upon the mandrel 12, which is of ordinary construction.

The tube A is composed of substantially three layers of material, which are mixed in various ways with chemicals, so as a different cure will be had upon each of the three different layers when the tube is completed and ready for commercial use.

The outer layer 13, which rests against the interior of the casing 10 is comparatively thick and comparatively firm and hard.

The inner layer 14 of the tube A is comparatively thin and made up of only a semi-cured rubber, while the middle layer 15 is of the commonly known Pará rubber with no cure at all.

On the mandrel 12, I have shown the inner layer of the casing on the outside, while the outside layer 13 is shown next to the mandrel.

In the manufacture of inner tubes, it will be understood, that inner tubes are made up of separate strips of material, which are wound or placed over a mandrel until the required amount of thickness is had, then the rubber is wrapped over with a strip of cloth. The strip of cloth holds the rubber against the mandrel 12 and acts as a form when the tube is being cured in the curing apparatus.

After the tube has been properly cured, the cloth is removed therefrom and the tube turned inside out, so that the layer 14, which was built up on the outside will then form the inside of the inner tube. The outer layer 13 of the tube A is mixed with chemicals, so that a one hundred per cent. cure may be substantially had. The middle layer is left without any chemicals, so that it is not cured at all, while the inner layer, the purpose of which will be hereafter more fully set forth, is so mixed with chemicals, that it will only be half cured.

In this way, when the entire tube has been wrapped and formed on the mandrel and is given the cure in the curing apparatus of forty-five minutes, the outer layer will be fully cured in that time, the middle layer will not be affected, while the inner layer will only be half cured.

Where the inner layer 14 is not used, I have found that the Pará rubber will tend to stick together when the tube is not inflated, and also that after the use of the tube for a while, the pure rubber layer 15 will split, because the material is of such nature that long use will cause that result.

In order to overcome the stretching and cracking of the Pará rubber layer 15, the inner thin layer 14 is provided. This is only semi-cured, but is of such strength and toughness, as to prevent the splitting of the rubber.

It will be understood that the cure which is given to the rubber is what causes the toughness and strength of the rubber.

In Fig. 5, I have shown a pin or nail 11, as extending through the tube. In Fig. 5, I have shown the inner tube 14 and outer tube 13 with the openings 16 and 17, which will be caused by the pin or nail 11.

It will be understood that since the outer layer is fully cured and the inner layer partially cured the openings 16 and 17 will practically remain, while the elastic material that is used in the midde layer 15 will be forced so that a portion of it will fill up the openings 16 and 17 and seal the communication between the openings 17 and 16.

It will be understood that especially when the tube is under compression, as it ordinarily is when punctured, that the soft elastic material used in the middle layer 15 will immediately seal the opening caused by the pin 11 and besides plug the openings 16 and 17.

It will be understood that instead of using the inner layer 14, it might be possible to cover the outside of the soft material 15 with sufficient chemicals, so that when the curing was done, the portion of the soft material 15, that would form the inside surface of the tube would be semi-cured, the outside layer entirely cured, and the layer of material between the semi-cured and fully cured layers would not be cured at all. This would practically accomplish the purpose of the layer 14 but would make it much more expensive, and there would be the danger of not getting the chemical spread evenly over the soft material 15 when it was being formed on the mandrel, thus forming many imperfect tubes, while by the arrangement I have shown in the drawings, using the three layers of material, I am always sure of making a tube that will stand up under the ordinary commercial use, that will be puncture proof, and yet when it is packed in cartons for shipping, the insides of the tube will not become stuck together, as the case would be if the thin layer of semi-cured material 14 were not used.

It will be readily understood that the advantages of my inner tube are that when the tube is punctured, the formation of the tube will cause the openings that will be formed to become sealed, thus doing away with the repairs and other inconveniences, that are ordinarily caused by the use of the present inner tube.

Another advantage of my tube is that it is comparatively much thicker than the ordinary tube, thus adding considerably to the life of the tube and making it much stronger in general.

It will be noted that I have provided a layer of practically pure Pará rubber between a fully vulcanized or cured layer and a partially vulcanized or cured layer. I have found that the best results can be obtained with this structure. The partially cured inner layer tends to close any puncture opening that may be made better than does a fully cured layer.

If the inner layer of partially vulcanized rubber is not used, several difficulties are sometimes experienced. The pure pará, when the tube is collapsed, will become stuck together on opposite sides of the tube and cannot then be pulled apart. A tube of that kind without the inner layer of vulcanized material can not be packed in a small package for storage or transportation, and even after it is put on the car may become flat, whereupon the opposite sides of the inner part of the tube will stick together.

It will be noted that should the tube in some way become cut, a patch may be vulcanized on it or a cold patch may be put on the outer layer of the tube in the ordinary way, so that repairs can be made in case it should require such repairs. In ordinary punctures, of course, no patches are necessary.

Some changes may be made in the arrangement and construction of the various parts of my device, without departing from the essential features and purposes thereof, and it is my intention to cover by my claim, any modified forms of structure or use of mechanical equivalents, which may be reasonably included within their scope.

I claim as my invention:

An inner tube adapted to be used in combination with a tire casing comprising a plurality of layers of rubber each of different degrees of elasticity, the outer layer being of less elasticity than the inner layer, the intermediate layer being of pure Pará rubber and having greater elasticity than either the outer or inner layers, said outer layer being comparatively thick in order to form the main body and strain resisting portion of the tube, the inner layer being comparatively thin in order to serve merely as a protective covering for the intermediate layer, whereby the sides of the tire will not stick together upon contact with said side, and whereby the intermediate layer will not crack, said intermediate layer being of such consistency that it will be forced by the pressure into any puncture in the outer layer.

Des Moines, Iowa, August 11, 1920.

ROBERT R. LLOYD.